United States Patent [19]

Shanbhag et al.

[11] 4,104,415
[45] Aug. 1, 1978

[54] PROCESS FOR PREPARING BACON ANALOG

[75] Inventors: Sudhakar P. Shanbhag, Yorktown Heights; Louis G. Liggett, Brooklyn; Adrienne C. Mikovits, Suffern, all of N.Y.

[73] Assignee: General Foods Corporation, White Plains, N.Y.

[21] Appl. No.: 622,272

[22] Filed: Oct. 10, 1975

[51] Int. Cl.² ............................................. A23J 3/00
[52] U.S. Cl. .................................. 426/656; 426/657; 426/802
[58] Field of Search ................. 426/89, 104, 802, 656, 426/657

[56] References Cited

U.S. PATENT DOCUMENTS

| 3,320,070 | 5/1967 | Hartman | 426/104 |
| 3,840,677 | 10/1974 | Leidy et al. | 426/104 X |
| 3,919,435 | 11/1975 | Feldbrugge et al. | 426/802 X |
| 3,930,033 | 12/1975 | Corliss et al. | 426/104 X |
| 3,999,474 | 12/1976 | Sienkiewicz et al. | 99/483 X |

FOREIGN PATENT DOCUMENTS 2,443,101  3/1975  Fed. Rep. of Germany ........... 426/104

Primary Examiner—Raymond N. Jones
Assistant Examiner—Esther M. Kepplinger
Attorney, Agent, or Firm—T. J. Carvis; D. J. Donovan; B. P. Struzzi

[57] ABSTRACT

An improved bacon analog product and a method for preparing it are provided. The improved product has more of the natural crispness of real bacon than earlier analogs. This improvement is noticeable not only initially upon opening the package but also after extended times in a moist environment. The improvement is obtained by virtue of improved formulation and processing.

5 Claims, No Drawings

PROCESS FOR PREPARING BACON ANALOG

BACKGROUND OF THE INVENTION

The invention relates to improvements in bacon analog products and processes. Although there have been many recent advances, the bacon-simulating products presently available continue to have disadvantages.

Considerable research has focused upon developing new ways for producing a variety meat-like, protein-containing foods from various vegetable and animal protein sources. Economics has provided a major incentive. The production of meat by animals is inefficient. It is more efficient and economically sound to directly employ the vegetable materials in the human diet to at least partially replace meat. This is especially true where the ever-increasing human population is feared to be outdistancing our ability to provide grazing land for meat-producing animals. Also, there are many good quality animal protein sources available which can provide low-cost alternatives to meat when properly processed.

Prior art efforts in producing meat analogs have generally failed in one or more respects to produce synthetic products having textures, appearances, and flavors equivalent to the natural products. However, progress is apparent over the years. An early patent to DeVoss, et al., U.S. Pat. No. 2,495,706, teaches forming a vegetable gel from the proteinaceous content of soybeans. Other early efforts were, as evidenced by the Boyer patents, U.S. Pat. No. 2,682,466; 2,730,447; and 2,730,448, drawn to preparing spun protein fibers resembling meat fibers. Later contributions were made by Anson, U.S. Pat. Nos. 2,802,737 and 2,839,902, who developed a vegetable protein product prepared from a nonuniform mixture of meat-like protein gel having therein a minor amount of kneaded dough. The Anson products were intended for preparing luncheon slices as a nutritious substitute for the meat-based luncheon slices on the market. Further developments by Anson are exemplified by the following U.S. Pat. Nos. 2,813,024; 2,813,025; 2,833,651, and 2,879,163, which are generally drawn to producing meat products resembling meat spreads, or drawn to the use of protein filaments to synthesize meat. A further attempt at making luncheon meat analogs and the like is disclosed by Durst, U.S. Pat. No. 3,108,873, who makes luncheon loaves by forming a gel-like dispersion containing an external phase formed from edible hydrophilic film-former, and a discontinuous internal phase formed from an edible lipophilic fluid.

The production of bacon analogs appears to be a promising facet of this technology. And the preparation of bacon-like products has progressed to the point that some bacon analogs have seen commercial exposure. One commercial bacon analog was based on a recent patent to Hartman, U.S. No. 3,320,070, which describes preparing a bacon analog by binding acid coagulated protein fibers with a vegetable protein matrix. Another commercial product is believed to be prepared according to the teachings of Belgian Pat. No. 825,123. U.S. Pat. No. 3,840,677 to Leidy et al., also describes a bacon-like product and a method for preparing it. That product and method overcame many of major shortcomings of earlier prior art efforts. Following the Leidy et al. disclosure, it is possible to produce synthetic bacon which has a texture, appearance, and flavor quite similar to natural bacon. This product, however, like natural bacon and many of the earlier prior art efforts, does not hold up to moisture as well as would be desired under some circumstances. If left exposed to moist air for extended periods of time after frying, it tends to lose its crispness. And, along this line, it and natural bacon tend to become softened after relatively short periods of time when placed next to a moist ingredient, such as a tomato in a BLT. Additionally, this bacon analog product is somewhat more friable than desired. It would, therefore, be advantageous to obtain a bacon analog which would better maintain its crispness in the presence of moisture and better resist rough handling.

In a recent patent application, Ser. No. 395,793, filed Sept. 10, 1973 and assigned to the assignee of the present application, a process and apparatus are disclosed for continuously producing bacon analogs of the type described by Leidy et al. The process described therein, however, does not fully recognize the advantages of preparing a relatively dense total product, lean and fat phases, and does not attain the most effective, higher densities. The process therein disclosed results in a product that is too susceptible to losing its crispness upon exposure to moisture and more friable than is desired. It would, therefore, be desirable to provide a process capable of producing a bacon analog product more resistant to moisture and rough handling.

SUMMARY OF THE INVENTION

Accordingly, it is an object of the present invention to provide a bacon analog product more resistant to moisture and rough handling.

It is another object of the present invention to provide a method for producing a bacon analog product which is more resistant to moisture and rough handling.

These and other objects are accomplished by the present invention which provides an improved bacon analog product and an improved process for preparing it. The improved bacon analog product of the present invention comprises a cooked, bacon-simulating material having a moisture content of less than 10%, a fat content of from about 10 to about 49%, a total solids content other than fat of at least 50%, and a density of greater than 1.03, said fully cooked strip being comprised of a plurality of distinct regions wherein: at least one region is a lean phase which texturally resembles the lean region of cooked bacon and comprises fat and at least 50% solids other than fat by weight of the region, said solids comprising from about 25 to about 75% protein based on the weight of the region; at least one region is a fat phase which texturally resembles the fat region of cooked bacon, and comprises at least about 40% fat and from 20 to 50% solids other than fat by weight of the region, said solids comprising from 10 to about 50% protein based on the weight of the region; said solids in the lean phase being present at a level of at least 10% higher than in said fat phase; said fat in said fat phase being present at a level of at least 10% higher than in said lean phase; the lean phase comprises more than 50% by weight of the analog; and the fat phase comprises no more than 30% by weight of the analog. Preferably, the product also contains at least one additional phase, comprising up to about 30% of the product, having textural properties and composition intermediate the lean and fat phases.

The improved bacon analog product is prepared by the process of the present invention which comprises: preparing a first slurry comprising from about 35 to about 55% water, from about 10 to about 20% fat, and from about 10 to about 50% of heat coagulable protein; preparing a second slurry comprising from about 20 to about 45% water, from about 25 to about 45% fat, and from about 15 to about 30% of heat coagulable protein; deaerating said first slurry sufficiently to raise the density thereof to above 1.08 g/cc; preparing a layered mass containing at least one layer of said first slurry and at least one layer of said second slurry, said first slurry amounting to at least 50% of the weight of the layered mass and said second slurry amounting to no more than 30% of the layered mass; heating said layered mass sufficiently to heat set the coaguable protein; slicing the resulting heat set layered mass; and immersing the slices into a bath of heated cooking oil at a temperature and for a time sufficient to reduce the moisture content of the slices to less than 10%. Preferably, the slices are positioned between at least two surfaces of a forming means for frying, and the forming means, holding the slices, is immersed into the cooking oil.

DETAILED DESCRIPTION

The present invention provides an improved bacon analog especially adapted to be marketed in a form ready for use. The consumer need only open the package, and, preferably, without the need for any heating, immediately enjoy the bacon analog in any recipe calling for cooked bacon. An especially desirable functionality of the product of this invention is found in sandwiches containing moist ingredients, such as lettuce and tomatoes where it remains crisp for extended times. Another desirable feature of this product is that any unused portion of the product can be stored for later use simply by reclosing the container. There is no need to use special precautions such as refrigeration or freezing to assure freshness. The product remains fresh and crisp for extended periods of time, even where the container is opened frequently and humid air allowed to enter.

These desirable attributes are believed to be obtained by virtue of the specific process and formulation employed which provide a relatively dense structure with a high solids content and relatively low fat content. The lean phase is prepared to have a relatively high density with a minimum of void space, and is employed in an amount greater than 50% of the total product. The density of this phase inhibits entrance of moisture into the product, allowing it to withstand contact with moist ingredients, such as lettuce and tomato, better even than natural bacon. Moreover, because at least the major portion of the product is comprised of the lean phase, the crispness of the overall product is high. The fat phase has a lower solids content and higher fat content than the lean phase, but its limited presence as a part of the total product, preferably in combination with an intermediate phase, increases the moisture resistance of the product.

The improved bacon analog product of the present invention has the appearance of a fully cooked piece of bacon. The moisture content of the product is less than 10%, and preferably less than about 5%, based on the weight of the total product. On gross analysis, the product will also contain from about 10 to about 49%, preferably from 33 to 43%, fat; from about 20 to about 45%, preferably from 30 to 40%, protein, and up to about 15%, preferably 5 to 10%, carbohydrate. The most desired products yet produced are found to contain about 35 to 40% fat, from about 31 to 34% protein and from about 7-9% carbohydrate, with total moisture approaching 5% or less.

This gross composition obviously averages that for the total product which is actually prepared to have a plurality of distinct regions. The overall composition ranges given above are, however, believed necessary to attain the objects of this invention. Especially important in this regard is the level of solids other than fat, it is presently believed that this must be high — e.g., at least 50%, and preferably greater than 55%. The most preferred range for solids other than fat appears to be within the range of from 55 to 65%. Thus, while the formulations for the distinct lean and fat phases of the product should provide the textural qualitites of the lean and fat phases of fried natural bacon as well as the expected textural differences of these phases, they should be prepared with a view towards obtaining the solids content and other aspects of the overall formulation which are necessary to attain the objects of this invention.

At least one of the distinct regions in the product is a lean phase which texturally resembles the lean region of cooked natural bacon. This phase is formulated to provide a high degree of crispiness, without fragility, to the product. This improved crispiness is noticeable not only initially as the package is opened, but also after extended periods of time in the presence of moisture. This desirable attribute is attained in part by the relatively high level of solids in this phase, in part by the low level of fat in this phase, in part by the relatively high density of this phase, and especially by a combination of these three features. In order to impart the maximum degree of crispness to the overall product, this lean phase will comprise at least 50% of the product. This amount of lean phase can be present in one region or a plurality of regions separated by regions of a fat or other phase. Typically, a strip of product about the size of a strip of cooked bacon will have two regions of lean phase as longitudinal stripes, one fat region to be described in detail later, and one intermediate layer also to be described in more detail later. Either the fat or intermediate region will separate the two lean stripes.

The lean phase comprises fat and at least 50% solids other than fat by weight of the region; preferably, the solids will comprise from about 55 to about 80% by weight of the lean region. The moisture of this phase will be in equilibrium with the remainder of the product and be below about 10%. The solids other than fat will typically comprise from about 10 to about 75% based on the weight of the region. Preferably, the protein will amount to a major proportion of the solids other than fat and will comprise from about 30 to about 60% by weight of the entire phase. The fat in the lean phase will be less than 40% by weight of the phase, and preferably will amount to from about 20 to about 35%. Any number of optional ingredients can be employed in the phase as long as they do not adversely affect either the processing or the final characteristics of the product. For example, particulate texturizing materials can be employed in the lean phase; and are in fact desirable in limited amounts up to about 20% by weight of the phase; preferred amounts will range from about 2 to about 10%. Typical of these particulate texturizing materials are those described in the aforementioned patent to Leidy et al, which disclosure is incorporated by reference. While preferably proteinaceous, these texturizing materials can also be based on cellulose or carbohydrates. Among these materials are carboxy methylcellulose, textaid modified starch, wheat flour, oat flour, soya grits, soya flour, collagen, defatted beef tissue, and the like. Also included in this phase as optional ingredients are flavor, color, vitamins and minerals in amounts desired or effective to provide their intended effect.

Also, important to the lean phase, as indicated above, is its relatively high density. Densities of above about 1.03 are believed necessary to attain the objects of the present invention, and preferred densities fall within the range of from about 1.05 to about 1.10. The improved process of the present invention enables attainment of these densities.

At least one of the distinct regions in the bacon analog of the present invention is a fat phase which texturally resembles the fat region of cooked natural bacon. This phase is formulated to provide a natural fat-like melt, but yet not be excessively sensitive to moisture. In order to obtain the desired mouthfeel of this fat phase without too greatly limiting the moisture resistance of the overall product, the fat phase will comprise no more than 30% by weight of the total product. Preferably, the fat phase will comprise from about 10 to about 25%, and more preferably about 13–18%, of the final product.

The fat phase comprises at least about 40% fat and from about 20 to 50% solids other than fat by weight of the phase. The solids can be those materials employed as solids in the lean phase and will typically comprise from about 10 to about 50% protein based on the weight of the phase. Preferably the protein will amount to about 20 to about 40% of the fat phase. The presence of relatively large amounts of fat is important to the fat phase to obtain the fried fat-like texture; thus, the presence of at least 40% fat, preferably from about 45 to about 60% fat, is believed necessary to the product of the present invention.

As with the lean phase, any number of optional ingredients can be employed in the fat phase as long as they do not adversely affect either the processing or the final characteristics of the product. Thus, optional ingredients such as flavor, color, vitamins and minerals can be employed in effective or otherwise desired amounts. Also present may be particulate texturizing materials of the kind employed in the lean phase. These materials are typically employed at levels up to about 10% by weight of the phase, and are preferably present at levels up to about 5%.

To obtain a desirable textural difference between the lean and fat phases, the lean phase formulation should contain 10, preferably 20%, more solids than the fat phase; and the fat phase formulation should contain 10%, preferably 20%, more fat than the lean phase; these differences being based on the relative amounts of solids and fat in the phases and not the weights of each present in the phases.

In addition to the lean and fat phases discussed above, the preferred product of the present invention provides at least one additional region of a phase having properties and composition intermediate those of the lean and fat phases. The object of this phase is to provide some of the desired attributes of a fat phase in the overall product, without sacrificing moisture resistance to the extent that would be necessary were more of the usual fat phase employed. This intermediate phase will comprise no more than 35% by weight of the total product; and, preferably will comprise from about 10 to about 30%, more preferably about 22–27%, of the total product. The combined weight of the fat and intermediate phases will preferably amount to from about 30 to 45% of the total product.

The preparation of this bacon analog product is facilitated by the improved process of the present invention. In its broadest aspects this method comprises forming slurries comprising fat, heat coagulable protein, and water, for each of the phases to appear in the product; deaerating at least the lean phase slurry; layering the slurries; heat setting the layered slurries; slicing the heat set material transversely of the length of the layers to thereby expose the distinct regions of the various phases; and deep fat frying the slices.

To prepare the lean phase slurry, the fat, water and heat coagulable protein are admixed and then thoroughly blended under sufficient agitation to emulsifying the fat in the water. The protein material present should be sufficient to provide adequate emulsion stability; however, additional emulsifiers known to the art can be added in effective amounts where desired. The preparation of the slurry is essentially as taught by the Leidy et al patent referred to above; however, it is critical to the present invention that the slurry be deaerated to an amount sufficient to increase the slurry density to greater than 1.08 g./cc., preferably 1.10, most preferably above 1.12 at 25° C. Deaeration can take place during or after slurry preparation.

The fat will be employed at a level of from about 10 to about 30% by weight of the slurry. If normally solid, the fat should be liquified prior blending. However, it is preferred to employ normally liquid fats such as corn oil, soybean oil, cottonseed oil, peanut oil, palm oil, coconut oil, and mixtures of these. The fats discussed in the Leidy et al. patent are suitable herein as are the usual animal fats such as tallow, lard, poultry fat, and the like.

As the heat coagulable protein, egg albumin and soy isolate are preferred; however, any nutritious protein capable of forming a strong gel upon heating would be satisfactory. Thus, also suitable for use according to the present invention are vegetable and animal proteins. The sources of vegetable protein may be derived from a wide variety of vegetable material as for example defatted oil seeds, and may include peanuts, cottonseed, peas, etc. The vegetable protein is in concentrated form and is preferably bland; and, in the case of soy, unwanted flavors are removed. Additionally, various animal sources can be employed as a protein source for this phase. Typical of these are whey, blood albumen, sodium casenate, casein, lactalbumin, collagen, fish protein, and egg protein, especially egg albumin. Preferably, the coagulable protein will comprise a combination of animal and vegetable proteins. Where egg albumin and soy isolate are employed, the albumin is preferably employed at a level of from about 1 to about 10%, and the soy isolate at a level of from about 5 to about 15%. The total amount of heat coagulable protein will typically range from about 10 to about 50%, preferably from about 20 to about 40%; and the ratio of egg albumin to soy isolate will fall within the range of from 1:4 to 1:1, and preferably from about 1:3 to 2:3.

Along with the fat and heat coagulable protein are admixed water and any number of desired optional ingredients employed at effective or otherwise desired levels not interfering with processing or final product quality. Thus, particulate texturizing materials of the kind described above and by Leidy et al. can be employed, as well as can suitable flavorings, colors, and vitamin and mineral supplements. The water added is that sufficient for processing only and should be kept to a minimum because it leaves voids in the product as it vaporizes during frying. Thus, the less water employed, the more dense the final product will be. Typically, water is employed at levels of from about 30 to about 55%, preferably from about 35 to about 50%, based on the weight of the slurry.

The fat phase slurry is prepared in a manner similar to the lean phase slurry, but varying the levels of ingredients to quantities which will produce a fried fatlike texture upon processing. Thus, the fat phase slurry will typically contain from about 20 to about 45% water, preferably from about 25 to 35%; from 25 to about 45% fat, preferably from about 30 to about 40%; from about 15 to about 35% heat coagulable protein, preferably from about 20 to about 30%; and various optional ingredients of the kind employed in the lean phase.

The types of fat, heat coagulable protein and optional ingredients which can be employed in the fat phase are the same as those which are appropriate for use in the lean phase. However, where the heat coagulable protein comprises a combination of egg albumin and soy isolate, the ratio of egg albumin to soy isolate will typically fall within the range of from 1:3 to 3:1, and preferably within the range of 2:3 to 3:2. The fat phase can be deaerated, if desired, to increase the moisture resistance of the product by increasing its density; however, this is not essential.

An intermediate phase, that is, a phase having a composition and final properties intermediate those of the lean and fat phases, can be prepared if desired. The use of such a phase is preferred and can be simply prepared by mixing the lean and fat phase slurries, either with or without red color which might be added to the lean phase. Typically, mixtures containing lean phase slurry and fat phase slurry at a ratios of from about 6:1 to about 1:1, and preferably from about 5:1 to about 3:1, can be employed. The slurries are combined by simple mixing. The intermediate phase slurry can also be deaerated prior to layering.

The slurries are layered in any manner suitable to provide controlably uniform layers. The techniques taught in either the Leidy et al. patent or the pending application Ser. No. 395,793, are suitable. Preferably, a layered mass of slurries is prepared by first applying a layer of lean phase slurry to a surface, applying a layer of the intermediate phase slurry thereover, next applying a second layer of lean phase slurry, and finally applying a layer of fat phase slurry. However, any suitable arrangement of layers which provides a visual, as well as textural, similarity to bacon is satisfactory.

The layered mass of slurries is heated as described by Leidy et al. to heat coagulate the protein and provide sufficient structural integrity to allow slicing into slices having a thickness of from about 0.05 to about 0.1 inches thick. To adequately heat set the mass, the internal temperature should be raised to at least 140° F, preferably about 150° F. This is easily obtained in a low pressure autoclave at a steam pressure of 15 psig for about 15 minutes where the thickness of the layered mass is under about one inch. Heat setting times such as those in Ser. No. 395,793 can also be employed.

Once heat set, the layered mass is sliced in a direction which will reveal a cross section showing each of the layers. Conveniently, slicing is done normal to the major dimensions of the layers. The slices are preferably from 0.060 to 0.065 inches thick. Thus sliced, a strip is obtained not looking unlike natural bacon sliced in the conventional manner.

The slices are deep fat fried to reduce their moisture content to less than 10%, preferably less than about 5%, and approaching 1.0%. Typically the oil bath will be heated to a temperature of from about 300° F to about 400° F and the slices will be immersed for from about 2 minutes to about 3½ minutes depending on thickness, bath temperature, and initial moisture content. Because the slices will become non-uniform in shape and cause packing problems where no precautions are taken, the slices are preferably placed between opposing support surfaces and dipped so held into the hot cooking oil. The opposed surfaces are preferably constructed of sheet metal or wire mesh and are so configured to mold the piece during frying into a slightly crinkled configuration — similar to that of fried natural bacon. According to the preferred embodiment, the two opposed surfaces are constructed of polytetrafluoroethylene coated steel and comprise a male and female shaping member. Both members have undulated surfaces which when brought together nest neatly one within the other. The slice is placed between the two members, which are spaced just sufficiently to allow contact of the oil with the major portion of the surface area of the slices, and the members are then immersed in the oil to fry the pieces.

The fried slices of bacon analog are removed from the hot oil, allowed to drain of excess oil, and packaged in a substantially moisture proof container. While a plastic coated foil pack of conventional construction would be suitable, the preferred container is a glass jar with a gasketed, metal screw cap. Jars of this type not only provide ease of access to the product but also make resealing of unused product a simple matter.

The following Examples are presented for the purpose of further illustrating and explaining the present invention and are not meant to be limiting in any regard. Unless otherwise indicated, all parts and percentages are by weight.

EXAMPLE I

A bacon analog according to the present invention is prepared from lean, fat and intermediate slurries having the following formulation:

| Ingrediants | PERCENT | | |
| --- | --- | --- | --- |
| | Lean Phase | Fat Phase | Intermediate Phase |
| Oil* | 16.9 | 35.0 | 21.3 |
| Ground, expanded soy protein | 4.2 | 0 | 3.5 |
| Soy Isolate | 11.5 | 9.5 | 11.5 |
| Egg Albumin | 6.2 | 9.9 | 7.2 |
| Color, Flavoring agents & minor nutrients | 13.6 | 14.9 | 11.5 |
| Water | 47.6 | 30.7 | 45.0 |

*Hydrogenated blend of soybean and cottonseed oil which has been fractionated.

The nature of each of these ingredients and the manner of their incorporation into the slurries are, except as noted, the same as in the Leidy et al. patent (Col. 8, line 55 to Col. 10, line 16). The lean phase contains sufficient red dye to give the product a light red coloration. The fat and intermediate phase slurries contained no added color. The lean phase slurry is deaerated by placing it in a vacuum mixer for about five to ten minutes to bring the density of this slurry to about 1.10. The slurries thus prepared are layered as in the manner indicated by the Leidy et al. patent in the following order and amounts:

1- lean phase slurry — 325 grams
2- Intermediate phase slurry — 240 grams
3- lean phase slurry —286 grams
4- fat phase slurry —155 grams The thus formed layered mass is then heat set in an autoclave at 15 psig for about 15 minutes. After cooling to room temperature, the heat set layered mass is sliced with a conventional bacon slicer to a thickness of about 0.062 inches. These slices are then placed between two polytetrafluoroethylene coated sheet metal forms having complimentary undulated surfaces spaced about 0.2 inches apart. These forms, holding the slices are then immersed in a heat bath of cooking oil maintained at a temperature of about 340° F for about two minutes and fifteen seconds. The moisture content of the slices is reduced to about 4.0%. The slices are removed from the forms and drained of excess oil. Upon analysis, these slices of bacon analog product have the following composition:

water—4.0
protein—32.8
fat—37.0
carbohydrate—8.0

The bacon analog product thus prepared shows good crispiness initially and after exposure to moisture.

EXAMPLE II

A further sample according to the present invention was prepared as in Example I having the following specific formulation:

| Ingredients | Parts Lean Phase | Intermediate Phase | Fat Phase |
|---|---|---|---|
| Soy Isolate | 322.50 | 215.00 | 118.00 |
| Monosodium Glutomate | 8.16 | 5.44 | 3.86 |
| Smoke Flavor | 8.45 | 2.86 | 3.60 |
| White Pepper | 1.17 | 0.96 | 1.12 |
| Hydrolyzed Vegetable Protein | 29.40 | 19.60 | 26.00 |
| Bacon Flavor* | 147.98 | 63.6 | 63.6 |
| Sodium Chloride | 66.10 | 40.20 | 40.00 |
| Egg Albumin (dry) | 172.50 | 115.00 | 122.80 |
| Sucrose | 89.70 | 57.80 | 46.40 |
| Ground Textured Protein | 118.20 | 78.80 | — |
| Dicalcium Phosphate | 11.50 | — | — |
| Zinc Oxide | 0.133 | — | — |
| Vitamins | 0.49 | — | — |
| Red #3, 0.1% Solution | 119.0 | — | — |
| Caramel Color, 5% Solution | 246.0 | — | — |
| Oil | 472.8 | 315.2 | 436.0 |
| Water | 977.4 | 871.5 | 382.4 |

*Contains Mostly Salt and Fat.

EXAMPLES III — IX

Seven additional product samples were prepared as in Example II, varying the levels of soy isolate, egg albumin, oil and water in the phases as indicated below:

| | EXAMPLES | | | | | | |
|---|---|---|---|---|---|---|---|
| Phase | III | IV | V | VI | VII | VIII | IX |
| Changed | LEAN | LEAN | FAT | FAT | LEAN | LEAN | FAT |
| Soy Isolate | | 380 | 155 | | 265 | | |
| Egg Albumin | | 108 | 73 | | 229 | | |
| Oil | 326 | | | 560 | | 584 | 622 |
| Water | 1073 | | | 320 | | 865 | 249 |

EXAMPLE X

To compare the product of the present invention with other bacon analog products, a commercial bacon analog product, a bacon analog product according to Example II of Leidy et al., and that of Example II of the present invention, were deep fat fried to obtain optimum texture and the densities were measured. The densities were measured with a Beckman Air Comparison Pycnometer, Model 930, and are as follows:

| | Product | Density (g/cc) |
|---|---|---|
| A. | Present Invention (Ex. II) | 1.07 – 1.08 |
| B. | Leidy et al (Ex. II) | 0.783 – 0.787 |
| C. | Commercial Product | 1.01 |

EXAMPLE XI

The samples prepared in Example X were subjected to a high humidity (85% R.H.) environment and tested at various intervals as follows:

(1) Sensory evaluations were made by a panel of experts trained to make textural evaluations on food samples and rate them on a scale from 1 to 9, with 1 being very crisp and 9 being soggy with no crispness. A value of about 5 indicates borderline satisfactory crispness for bacon. The experts did not know which sample they were testing at any given time. The results are shown below:

| TIME (HOURS) | CRISPNESS A | B | C |
|---|---|---|---|
| 0 | 2.0 | 2.3 | 2.7 |
| 0.5 | 2.7 | 3.3 | 3.0 |
| 1.0 | 4.0 | 5.0 | 4.7 |
| 1.5 | 3.7 | 6.3 | 5.7 |
| 2.0 | 4.7 | 7.0 | 6.7 |
| 2.5 | 5.3 | 7.0 | 7.3 |
| 3.0 | 5.7 | 7.0 | 5.3 |

(2) The moisture contents of these samples were also recorded. The results are shown below:

| TIME | MOISTURE % A | B | C |
|---|---|---|---|
| 0 | 3 | 0.8 | 0.9 |
| 0.5 | 6.2 | 3.0 | 3.9 |
| 1.0 | 7.1 | 3.8 | 4.2 |
| 1.5 | 7.8 | 5.8 | 5.0 |
| 2.0 | 9.3 | 6.0 | 6.3 |
| 2.5 | 8.7 | 7.6 | 6.0 |
| 3.0 | 10.1 | 7.6 | 7.1 |

A plot of the crispness values versus moisture content of the samples shows that sample A had a higher level of crispness (lower numerical value) than either of samples B and C for any given product moisture content. The slope of these curves further indicates that Sample A would lose its crispness more slowly than B or C as the amount of moisture increased.

(3) Instron snap tests were also conducted on the samples at time zero and after one half hour exposure to the 85% R.H. atmosphere. The results are as follows:

| TIME | DEFLECTION (mm) | | |
| (HOURS) | A | B | C |
|---|---|---|---|
| 0 | 0.76 | 0.68 | 0.60 |
| ½ | 0.75 | 1.30 | 1.08 |

The above description provides sufficient information to enable the person skilled in the art to practice the present invention, but does not attempt to describe all those modifications and variations thereof which will become apparent to those skilled in the art upon reading this disclosure. However, all such obvious modifications and variations are intended to be included within the scope of the present invention which is defined by the following claims.

What is claimed is:

1. A process for preparing a bacon analog comprising: preparing a first slurry comprising from about 35 to about 55% water, from about 10 to about 20% fat, and from about 10 to about 50% of heat coagulable protein; preparing a second slurry comprising from about 20 to about 45% water, from about 25 to about 45% fat, and from about 15 to about 30% of heat coagulable protein; deaerating said first slurry sufficiently to raise the density thereof to about 1.08 g/cc; preparing a layered mass containing at least one layer of said first slurry and at least one layer of said second slurry, said first slurry amounting to at least 50% of the weight of the layered mass and said second slurry amounting to no more than 30% of the layered mass; heating said layered mass sufficiently to heat set the coagulable protein; slicing the resulting heat set layered mass; and immersing the slices into a bath of heated cooking oil at a temperature and for a time sufficient to reduce the moisture content of the slices to less than 10%.

2. A process according to claim 1 wherein the slices are positioned between at least two surfaces of a forming means for frying, and the forming means, holding the slices, is immersed into the cooking oil.

3. A process according to claim 1 wherein the lean phase is deaerated to a density above 1.10 g/cc prior to heating the layered mass to heat set the coagulable protein.

4. A process according to claim 1 wherein the moisture content of the slices is reduced to less than 5%.

5. A process according to claim 1 including the steps of forming a third slurry having a composition intermediate that of said first and second slurries and layering it in contact with either said first or second slurry in the layered mass.

* * * * *